Patented Apr. 13, 1954

2,675,320

UNITED STATES PATENT OFFICE 2,675,320

COATED PIGMENT AND MINERAL OIL INK CONTAINING SAME

George L. M. Christopher, New Canaan, Conn., and Frank Tarantino, North Plainfield, N. J., assignors to American Cyanamid Company, New York, N. Y., a corporation of Maine No Drawing. Application June 12, 1951, Serial No. 231,265

20 Claims. (Cl. 106—32)

This invention relates to an improved pigment dispersion in hydrocarbon printing inks.

In the past, most printing inks have been made up in the form of a quick-setting varnish, the greater portion of the vehicle being predominantly of the drying oil type. These printing inks have, for the most part, exhibited satisfactory rheological properties and acceptable strength and texture. They have, however, some drawbacks, for example, the cost of a drying oil varnish constitutes a substantial cost factor, also, there is a tendency for printing inks of the varnish type to set up when exposed to the air, which has presented some storage problems.

It has long been desired to produce a satisfactory printing ink using most organic pigments and some inorganic pigments, in which the vehicle is a mineral oil, that is to say, predominantly non-aromatic hydrocarbons. However, up to the present time, with a few special purpose exceptions, mineral oil base printing inks have not given quality printing because of the poor dispersion of pigments in this vehicle, which cause increase of plastic viscosity, yield values and thixotropy. Strength and texture have also frequently been relatively unsatisfactory. Throughout the present specification, the term "mineral oil" will be used in its more precise sense as a hydrocarbon vehicle of predominantly non-aromatic nature.

The present invention is based on the surprising fact that certain sulfosuccinates, when present in small quantities, produce an excellent dispersion with markedly improved rheological properties, such as plastic viscosity, yield value and thixotropy, and in many cases also with an improved texture and strength.

The sulfosuccinates have achieved a very large field of utility as wetting and emulsifying agents and also as detergents. For the most part, they have been designed for dispersion in aqueous or mixed aqueous oily media and the most active of the sulfosuccinates have been those where there is a fine balance of hydrophilic and lipophilic groups in the molecule. Commercially the most widely sold and technically about the strongest surface-active sulfosuccinate is the bis (ethylhexyl) sulfosuccinate. Other commercially sold wetting agents of the sulfosuccinate type are those in which the hydrocarbon chain of the alcohol forming the ester contains four, five or six carbon atoms.

None of the highly surface-active sulfosuccinates referred to above have any appreciable effect when added to a mineral oil base printing ink. The mineral oil which is the base of the printing ink is predominantly non-aromatic in character, the present invention being useful only with vehicles in which the aromatic content is less than 50%. Throughout the specification, the term "mineral oil" will be used in this more precise sense. However, we have found that when sulfosuccinates with hydrocarbon chains of at least nine carbon atoms are used, there is a marked decrease in viscosity without any adverse effect on other rheological characteristics and in some cases with an increase in strength and improvement in texture.

The preferred embodiment of the present invention involves mineral oil base printing inks having highly branched, long chain sulfosuccinates. When the branched chain compounds are used, not only is there the same and in some cases even greater fluidity of the ink, but there are great improvements in the other rheological properties as well as a very great improvement in texture and in strenth. These branched chain compounds are preferred and permit producing inks of optimum characteristics.

It is not necessary in every case that the sulfosuccinates contain their carbon chains in two alcohol residues. Some improvements in characteristics are obtainable when a disodium sulfosuccinate is used. Most of these products are by no means as good as the diesters, except with certain pigments, but they do reduce viscosity and improve strength. They are therefore included in the present invention, although they fall considerably short of the improved properties obtainable with the best branched chain diesters.

When polyfunctional alcohols are used, such as for example monoglycerides of fatty acids, linear polymers may be prepared. These produce inks with improved strength and consistency and with very markedly improved textures. Such polysulfosuccinates are therefore included in the invention.

The sulfosuccinates are used, as is customary, in the form of salts. By far the cheapest and most commercial form is the sodium salt, although the other alkali and alkaline earth metals may replace the sodium. With certain sulfosuccinates, the barium salts are desirable. The general formula of the sulfosuccinates used in the present invention may be represented as follows:

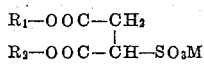

where M is a strongly basic metal, $R_1$ and $R_2$ are selected from the group consisting of alkyl and the residue of incompletely esterified glycerine, M is selected from the group consisting of strong basic metals and $R_1$ and $R_2$ have a total of at least eighteen carbon atoms.

Various methods of incorporating the sulfosuccinates into the mineral oil printing inks are possible:

The first method involves introducing the sulfosuccinate into the printing ink when it is being prepared.

The second method is to slurry the pigment in an aqueous medium with a sulfosuccinate, recovering the coated pigment and drying it. The product of this second method is in itself a new composition in which the sulfosuccinate is uniformly coated onto the pigment particles.

The third method is one in which the sulfosuccinate is mixed with the pigment agent in the form of a press cake, mineral oil added, and the emulsion broken. This flushes the pigment into the mineral oil. The water layer can then be decanted.

The fourth method involves adding the sulfosuccinate to the oil or ink vehicle itself. This last method makes it possible to use untreated pigments and in some cases this added flexibility is of practical importance. When the fourth method is used, barium salts of the sulfosuccinates give better results which is in contrast to the other three methods in which sodium salts are usually preferable.

The methods are, to a large extent, interchangeable, though certain pigments are more easily treated by one method than by the other. For example, the pigment alkali blue (phenolated para-rosaniline), which is a particularly bad bodying pigment in mineral oil inks, is preferably treated by the second of the four methods described above. It is an advantage of the present invention that the method of introducing the sulfosuccinate is flexible and the most convenient method may be used by the colorist in each case.

The amount of the sulfosuccinate to be used is not critical and will vary with different types of pigments. Thus, for example, 10-30% gives good results with pigments such as alkali blue, while much smaller amounts are preferable with pigments such as titanium dioxide where as little as about 1% will give effective results. Certain other pigments, such as carbon black, require larger amounts of agent for best results. In general, however, it is economically not worthwhile to use more than 60-100% of agent, although even larger quantities may be employed without harm in many cases. The amount of agent to be used for optimum results depends, to a considerable extent, upon the surface area of the pigment. When the pigment has a relatively small surface area, such as 8-10 square meters per gram as in the case of titanium dioxide, very small amounts of agent ranging down to 1% or less can be used. Alkali blue, with about 100 square meters of surface area per gram, requires more agent as has been pointed out above.

The variation in the amount of agent required for various pigments, depending on their surface area, is in line with the known facts that in pigment dispersion it is the character of the surface of the pigment which counts. In general, the minimum useful amount of agent is that corresponding to a monomolecular layer. Polymolecular layers, that is an excess over the minimum required, are often desirable, as they give a greater margin of safety and insure that there is a full coating of all of the pigment. The present invention, therefore, contemplates any amount of agent above the minimum corresponding to the monomolecular layer of the pigment used.

It is a further advantage of the invention that a wide variety of mineral oil ink bases may be used. The invention is generally applicable and while there will, of course, be slight differences in improvement of properties with different mineral oil ink bases, the general effect is substantially the same with all mineral oil ink vehicles.

The invention will be described in greater detail in conjunction with the specific examples where, for the most part, precise laboratory and mulling procedures are recited in order to permit accurate reproducibility, it being difficult to define the exact degree of mixing effected with different designs of ink mills without specifying the exact structure, which of course plays no part in the present invention. The practical colorist is accustomed to translating precise laboratory and mulling procedures into the proper procedure for ink mixing machines of the particular design which he may be using in his plant. The improvements in rheological properties, strength and texture are the same, regardless of whether the inks are prepared by precision laboratory mulling technique or in the customary ink mills. In the examples the parts are by weight unless otherwise specified.

The present invention is applicable to organic and inorganic pigments generally. Among the most important are alkali blue, which has been referred to above, phloxine toner, barium lithol red, peacock blue, chrome yellow, chrome green, iron blues and titanium dioxide. The agents of the present invention impart improved rheological properties to all of the pigments, with the exception of the benzidine yellows which are known to be unresponsive to the usual dispersing agents in printing inks. The degree of improvement in rheological properties will vary with different pigments and with different agents and an agent which gives extremely good results with one pigment may give mediocre results with another. It is not known why there should be considerable variation in the degree of improvement obtained by using the present invention, therefore it is not intended to limit the invention to a theory as to why there are differences in results. However, the effect seems to be entirely a surface effect. Therefore, it seems probable that different affinities for different pigments, which re-

EXAMPLE 1

The diester of maleic acid and 7-ethyl-2-methyl-4-undecyl alcohol is prepared by esterifying the alcohol with maleic acid to form the monoester and then forming the diester with an excess of alcohol by heating in the presence of a water binding agent such as sulfuric acid. Excess alcohol is then removed by distillation under high vacuum and the ester transformed into a sulfosuccinate product by reaction in an aqueous medium with sodium bisulfite. The compound produced has the following formula:

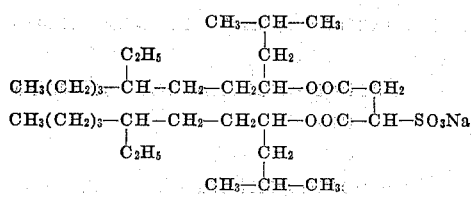

100 parts of the sodium sulfosuccinate described above are spatula mulled into 1100 parts of mineral oil (ink oil). This is then mulled four times one hundred (4×100) with 700 parts of the mono sulfonic acid of phenylated para rosaniline (alkali blue dye powder) using a weight of 150 pounds on the muller.

A second ink sample is prepared exactly as above except the surface-active material is omitted and 1200 parts of ink oil used. When the sample containing the surface-active material is evaluated against the control sample, its printing strength is 116% vs. the control and the over-all consistency is considerably lighter than that of the control sample.

EXAMPLE 2

The fumaric acid diester of 5-ethyl-2-nonyl alcohol is prepared by esterifying at elevated temperature with a water binding agent such as sulfuric acid and the ester recovered from the excess alcohol by distilling off the latter under high vacuum. The ester is then transformed into the corresponding sulfosuccinate by reaction in aqueous medium with sodium bisulfite. The compound produced has the following formula:

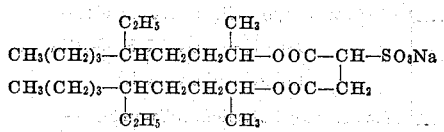

The procedure of Example 1 is followed, except that the sulfosuccinate described above is used in place of the one described in Example 1. A control sample was prepared as described in Example 1 and, when the product of the present example was evaluated against it, it tested 116% in strength and the consistency was considerably lighter.

EXAMPLE 3

A diester with maleic or fumaric acid and 2,6,8-trimethyl-4-nonyl alcohol was prepared by the procedure of Example 1 or Example 2 and was transformed into the sodium sulfosuccinate as there described. The compound had the following formula:

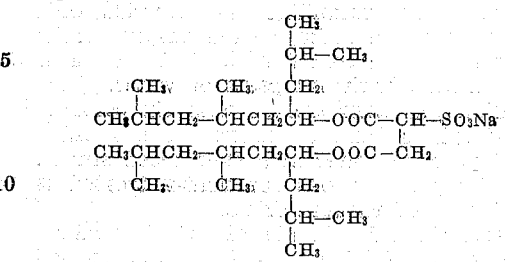

An ink and control sample were prepared as described in Example 1 using the above described sodium sulfosuccinate. When the ink of the present example was evaluated against the control sample, a color value of 113% was obtained and the consistency was lighter.

EXAMPLE 4

A diester of maleic or fumaric acid with 2,8-dimethyl-6-isobutyl-4-nonyl alcohol was prepared by the process of either Example 1 or Example 2 and transformed into the corresponding sodium sulfosuccinate by the process of either example. The compound produced had the following formula:

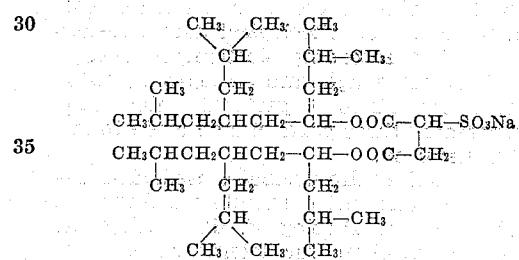

A printing ink and a control sample were prepared as described in Example 1 using the above sulfosuccinate. The ink of the present example was 115% of the strength of the control sample and the consistency was moderately lighter.

EXAMPLE 5

A diester of maleic or fumaric acid with 3,5,5-trimethyl hexyl alcohol was prepared by the process of either Example 1 or Example 2 and transformed into the corresponding sodium sulfosuccinate as described therein. The compound had the following formula:

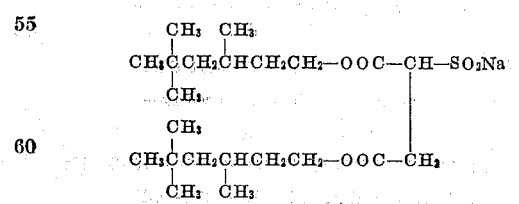

A printing ink using the above sulfosuccinate and a control sample were prepared as described in Example 1. The ink of the present example was 109% of the strength of the control sample and the consistency was moderately lighter.

EXAMPLE 6

A diester of maleic or fumaric acid with n-decyl alcohol was prepared by the process of either Example 1 or Example 2 and transformed into the corresponding sodium sulfosuccinate as described therein.

154 parts of press cake containing about 40 parts of real pigment (mono sulfonic acid of phenylated para rosaniline) are slurried with sufficient water to make a 9.8% suspension by passing through a colloid mill. This was then diluted further with 924 parts of water. This suspension was then treated with six parts of bis-(n-decyl) sodium sulfosuccinate suspended in 1600 parts of water in a slow speed stirrer. When the pigment was sufficiently treated it was filtered and vacuum dried.

25 parts of the dried material were then mixed with 50 parts of ink oil. This suspension was then ground in eight passes on a three-roll laboratory ink mill, then diluted with 25 parts additional ink oil and given two additional passes on the ink mill. A strength test was then made by reducing with a zinc oxide paste by the usual accepted standard procedure.

A control sample was prepared as above except the surface-active agent was omitted. When the control sample was assigned a value of 100%, the strength of the sample containing the surface-active agent was 107%.

EXAMPLE 7

The procedure of Example 6 was followed using the following surface-active agents, which were all prepared by the process described in Example 1 or Example 2. The rheological data were determined with a recording plastometer, texture with a Hegmann gauge, and strength by using one part of the ink to 90 parts of a zinc oxide paste containing three parts of zinc oxide to one part of mineral oil.

Table I gives the sulfosuccinates used, identifying them by consecutive sample number, and Table II gives the rheological data using the same sample numbers for identification as is obvious. Low figures for viscosity yield value and thixotropy are desired, whereas high values of strength and texture represent improvements.

Table I

| Sample Number | Surface-Active Agent and Formula |
|---|---|
| 1 | Bis (7-ethyl-2-methyl-4-undecyl) sodium sulfosuccinate— |
| 2 | Bis (5-ethyl-2-nonyl) sodium sulfosuccinate— |
| 3 | Bis (2,6,8-trimethyl-4-nonyl) sodium sulfosuccinate— |
| 4 | Bis (2,8-dimethyl-6-isobutyl-4-nonyl) sodium sulfosuccinate— |
| 5 | Bis (3,5,5-trimethyl hexyl) sodium sulfosuccinate— |
| 6 | Bis (tridecyl) sodium sulfosuccinate. |
| 7 | Bis (2-butyl octyl) sodium sulfosuccinate— |
| 8 | Bis mixed {2-butyl hexyl / 2-ethyl octyl} Sodium sulfosuccinate— |
| 9 | Bis (n-decyl) sodium sulfosuccinate— |
| 10 | Bis (n-dodecyl) sodium sulfosuccinate— |
| 11 | Bis (n-hexadecyl) sodium sulfosuccinate— |
| 12 | Bis (n-octadecyl) sodium sulfosuccinate— |
| 13 [1] | Mono octadecyl disodium sulfosuccinate— |
| 14 [1] | 5,7,7,-trimethyl-2(1'3'3'-trimethyl-butyl) octyl disodium sulfosuccinate— |

[1] The monoalkyl disodium sulfosuccinates are prepared by forming the monomaleates of the alcohols and sulfonating with sodium sulfite instead of sodium bisulfite.

Table II

| Sample Number | Plastic Viscosity in Poises | Yield Value, Kilodynes | Thixotropy per cm. sq. | Strength, percent | Texture |
|---|---|---|---|---|---|
| Control | 70 | 5.5 | 5.7 | 100 | 0 |
| 1 | 21 | 2.1 | 0.1 | 109 | 8 |
| 2 | 26.2 | 2.0 | 0.5 | 109 | 8 |
| 3 | 32.6 | 3.3 | 1.6 | 118 | 8 |
| 4 | 32.8 | 1.5 | 0.2 | 107 | 8 |
| 5 | 22.0 | 1.7 | 0.9 | 109 | 8 |
| 6 | 36.0 | 1.4 | 0.29 | 110 | 7 |
| 7 | 42.8 | 3.3 | 1.0 | 106 | 5 |
| 8 | 37.5 | 4.2 | 1.9 | 107 | 3 |
| 9 | 30.2 | 5.1 | 2.1 | 107 | 1 |
| 10 | 33.4 | 5.7 | 1.1 | 107 | 0.5 |
| 11 | 31.4 | 3.5 | 1.0 | 99 | 0 |
| 12 | 33.8 | 4.8 | 3.2 | 100 | 0 |
| 13 | 40.4 | 7.2 | 4.0 | 107 | 0 |
| 14 | 43.6 | 7.6 | 3.2 | 119 | 0 |

It will be observed that in every case there is a marked lowering of viscosity. Except for sample 10 and the monoalkyl disodium sulfosuccinates of samples 13, 14 and 15, there are improved figures for yield value. In all cases there are improved figures for thixotropy and with the exception of samples 11 and 12, there is an improvement in strength. As far as texture is concerned, it will be noted that the preferred branched chain products, samples 1 to 9, are the ones that show the greatest improvement in texture. In fact, these are the samples that show the best rheological properties in general.

EXAMPLE 8

300 parts of alkali blue press cake containing 88 parts real pigment were charged into a one-quart size dough mixer. 19.8 parts of the surface-active agent bis (7-ethyl-2-methyl-4-undecyl) sodium sulfosuccinate were then entered and mixed for ten minutes. This gives a treated pigment. 50 parts of ink oil were then added and mixed for 15 minutes when the emulsion broke and the separated water was removed by recantation. 100 parts additional press cake and 20 parts additional ink oil were then added to the above, again mixed for 15 minutes at which time the separated water again was removed by decantation. Again 100 parts of the press cake and 36 parts of ink oil were entered and the product was mixed until the emulsion broke, after which the separated water was removed by decantation. Finally, 69 parts of ink oil were added and mixed for about ten minutes until the paste was uniform. This ink paste which contained about 16% water was then transferred to a laboratory three-roll ink mill where it received five passes during which the ink temperature on the mill was maintained between 53–59° C. The final moisture content was below 1%.

It was not possible to prepare a control sample by the above procedure because alkali blue pigment will not flush in straight mineral oil. However, a control sample was prepared as in the procedure of Example 1 using the same ratio of pigment to oil as in the above example. The ink containing the surface-active agent when tested against this control gave amazing results. The ink prepared in the presence of the surface-active agent tested 125% against the control in which no surface-active agent was present. Furthermore, when this ink was further diluted with ink oil thus reducing its concentration of pigment to about 25%, then giving it two passes on the ink mill, the color value was 130% strength against a control which contained the same pigment-mineral oil ratio but in which no surface-active agent was present. Furthermore, the viscosity of the sample containing the surface-active agent was approximately 24 poises compared to 70 poises for the mineral in which no surface-active agent was present.

Furthermore, the Hegmann reading of the ink in which the surface-active agent was present was 7, whereas the Hegmann reading of the control sample in which no surface-active agent was present was zero. The maximum reading obtainable by this procedure is 8.

EXAMPLE 9

The procedure of Example 1 is repeated except the pigment brominated fluorescein precipitated with a soluble lead salt is used instead of the alkali blue of Example 1. This is phloxine toner.

A control sample was prepared using this phloxine toner, but no surface-active agent was added.

The strength of the ink containing the surface-active agent was 110% against the control sample, and the over-all consistency was considerably lighter than the control.

EXAMPLE 10

The procedure of the preceding example is repeated except the pigment Peacock Blue barium salt of Erioglaucine on aluminum hydrate base was used. The body consistency of the ink which contains the surface-active agent was much lighter than that of the control sample.

EXAMPLE 11

The procedure of the preceding example is repeated except the pigment barium Lithol red toner (CI 189) is used instead of the Peacock Blue. The ink containing the surface-active agent is stronger and the body slightly lighter than the control sample.

EXAMPLE 12

360 parts of the agent of Example 1 and 440 parts of ink oil are mulled as in Example 1. 2,400 parts of chrome yellow pigment (CI 1270) in the form of a dry powder are mulled 2×25 mulls as in Example 1 using 150 pounds on the muller. When this ink is compared with a control in which no surface-active agent is present, the over-all consistency is considerably lighter.

EXAMPLE 13

The procedure of Example 1 is repeated with the following proportions used. The color in this example is Milori Iron Blue (CI 1288). 75 parts of the agent of Example 1 are mulled into 425 parts of the ink oil. This is then mulled 4×50 with 500 parts of the iron blue powder using a weight of 150 pounds on the muller. The strength of the ink prepared with the surface-active agent present is 104% against a control sample in which no surface-active agent is used and the consistency is considerably lighter than that of the control sample.

EXAMPLE 14

The procedure of the preceding example is repeated except the surface-active agent bis (3,5,5-trimethyl hexyl) sodium sulfosuccinate is used instead of the surface-active agent of Example 1. The consistency of the product containing the surface-active agent is slightly lighter than that of the control sample, and the strength is 104% against 100% for the control sample.

EXAMPLE 15

The procedure of Example 1 is repeated using the following proportions. 100 parts of the agent of Example 1 are spatula mulled with 900 parts of the ink oil. This is then mulled 4×50 with 2000 parts of titanium dioxide pigment (CI 1264) in the form of a dry powder using a weight of 150 pounds on the muller. The strength of this ink containing the surface-active agent is slightly stronger and the body is lighter than that of the control sample.

EXAMPLE 16

420 parts of sodium sulfosuccinate of diglyceride of tallow acids are spatula mulled into 780 parts of mineral oil (ink oil). This is then mulled 4×50 with 700 parts of Carbon Black (CI 1308) having a particle size of 28 millimicrons and using a weight of 150 pounds on the muller.

A second ink sample is prepared exactly as above except the surface-active material is omitted and 1200 parts of ink oil used. When the sample containing the surface-active material is evaluated against the control sample, its printing strength is 100% against the control and the over-all consistency is moderately lighter than that of the control sample.

EXAMPLE 17

The procedure of Example 1 was followed, using different concentrations of bis (7-ethyl-2-methyl-4-undecyl) sodium sulfosuccinate. The agent was applied first in a concentration of 15% of the pigment and then 30%. The rheological properties were compared with the control sample of Example 6. Viscosity was 31.8 and 27.8, yield value 1.54 and 1.0, thixotropy 0.42 and 0.41, strength percent 103 and 104, and texture 7 and 8. It will be apparent that after sufficient agent is present to assure a substantially unbroken coating, additional agent has but little effect. Similar observations can be made with other agents.

EXAMPLE 18

The procedure of Example 17 was followed using various pigments. The results are shown in Table III.

*Table III*

| Pigment | Quantities of— | | | Mulls at 150 lb. | Percent Strength | Consistency |
|---|---|---|---|---|---|---|
| | Pigment, g. | Mineral Oil, g. | Agent, g. | | | |
| Phloxine | .700 | 1.100 | .100 | 4×50 | 110 | Cons. lighter. |
| Peacock Blue | .700 | 1.100 | .100 | 4×50 | 100 | Mod. lighter. |
| Lithol Red | .700 | 1.100 | .100 | 4×50 | 102 | Sl. lighter. |
| Chrome Yellow | 2.400 | .440 | .360 | 2×25 | 100 | Cons. lighter. |
| Benzidine Yellow | .700 | 1.100 | .100 | 4×50 | 100 | Equal. |
| Do | .700 | 1.000 | .200 | 4×50 | 100 | Trace lighter. |
| Do | .700 | .850 | .350 | 4×50 | 100 | Do. |
| Do | .700 | .700 | .500 | 4×50 | 100 | Do. |

EXAMPLE 19

Three inks were prepared with titanium dioxide by the procedure of Example 1. The first ink had no agent, the second bis (7-ethyl-2-methyl-4-undecyl) sodium sulfosuccinate, and the third bis (3,5,5-trimethyl hexyl) sodium sulfosuccinate. The properties are as follows:

*Table IV*

| Ink Sample | Quantities of— | | | Percent Strength | Consistency | Texture |
|---|---|---|---|---|---|---|
| | Agent, g. | Mineral Oil, g. | Pigment, g. | | | |
| 1 | 0 | 1.000 | 2.000 | 100 | Type | 0 |
| 2 | .020 | .980 | 2.000 | 100 | Cons. lighter | 5 |
| 3 | .020 | .980 | 2.000 | 100 | Mod. lighter | 0 |

EXAMPLE 20

75 parts of each of a series of surface active agents were spatula mulled in 925 parts of mineral ink oil. This was then mulled 4×100 with 500 parts of the mono sulfonic acid of phenylated para rosaniline (alkali blue dye powder), using a weight of 150 pounds on the muller. The surface-active agents are identified by sample numbers in Table V.

Table V

| Sample Number | Surface-Active Agent and Formula |
|---|---|
| 16 | Polysulfosuccinate of monoglyceride of tallow acid sodium salts $$\begin{bmatrix} C_{17}H_{35} & & C-C_{17}H_{35} \\ | & & O \\ C & & O \\ O & & CH_2 \\ CH_2 & CH_2-COO-CH_2CHO \\ O-CH-CH_2-OOC-CH-SO_3Na & \end{bmatrix}$$ |
| 17 | Bis (3-octadecanoyl oxy-2-hydroxy-propyl) sodium sulfosuccinate— $$C_{17}H_{35}COOCH_2$$ $$HO-CH \quad CH_2-COO-CH_2-CH-CH_2-OOC-C_{17}H_{35}$$ $$CH_2-OOC-CH-SO_3Na \quad OH$$ |
| 18 | Sodium di-(4-amyl cyclo hexyl) sulfosuccinate— |
| 19 | Sodium di-(4-secondary butyl $C_4$) sulfosuccinate— |
| 20 | Bis [(1,3-diocta decanoyl oxy) 2-propyl] sodium sulfosuccinate— |
| 21 | Barium bis tridecyl sulfosuccinate. |

A second ink sample was prepared exactly as above except the surface-active material was omitted and 1000 parts of ink oil used. The samples containing the surface-active material were evaulated against the control sample. Printing strength, consistency, and texture are shown in Table VI, below.

Table VI

| Sample Number | Percent Strength | Consistency | Texture |
|---|---|---|---|
| 17 | 106 | Much lighter | 5 |
| 18 | 102 | Considerably lighter | 3 |
| 19 | 100 | do | 3 |
| 20 | 108 | Much lighter | 5 |
| 21 | 118 | Considerably lighter | 1 |

EXAMPLE 21

Two pigments were prepared with the sodium salt, the polysulfosuccinate of the monoglyceride of tallow acids, and bisoleyl sodium sulfosuccinate, respectively. In each case 4.5 parts of the surface active agent were stirred into 2000 parts of warm water, 65° C. The dispersed agents were then added to slurries of 30 parts of the azo dye from paranitro-orthotoluidine and the anilide of beta-hydroxynaphthoic acid in 1000 parts of water. After the addition of all the surface active agents, stirring was continued until a completely uniform treated pigment was obtained. The slurries were then filtered and the cakes air-dried to constant weight at 61° C. and crushed in a mortar. Inks were then made up with the two pigments, (A) one treated with a polysulfosuccinate, (B) the pigment treated with bis-oleyl sodium sulfosuccinate, and (C) an untreated pigment. In each case the 25 parts of pigment were ground into 75 parts of a vehicle containing 50% zinc resinate, 35% V. M. & P. naphtha (a predominantly non-aromatic mineral oil) and 15% toluene and ground in a ball mill for 7 hours, samples being taken out at 1, 2, 3, 5, and 7 hours. The following table shows the results obtained.

| Sample | Hegmann Textures—Ball Mill Grind in Hrs. | | | | | MacMichael Viscosity—30 R. P. M. 32 Wire, 26° C., 7th Hr. Grind |
|---|---|---|---|---|---|---|
| | 1 | 2 | 3 | 5 | 7 | |
| A | .0 | .3 | 5 | 7 | 8 | 20 |
| B | .2 | .4 | 6 | 8 | 8 | 30 |
| C | (¹)0 | 1 | 3 | 6 | 8 | 50 |

¹ Very bad.

It will be noted that the inks made up with the treated pigments grind to optimum texture much more rapidly and show markedly reduced viscosity. There was no material difference in strength, ink A showing substantially the same strength as the untreated pigment and B about 5% strength loss.

EXAMPLE 22

1017 parts of paraffin mineral oil sold under the name "Nujol" were stirred with 63 parts of bis-(tridecyl)-sodium sulfosuccinate, the temperature being maintained at 150° C. and stirring continued until complete dispersion resulted. The treated oil was then cooled and used in the preparation of a pigmented paste prepared by mixing 45 parts of Milori Blue with 54 parts of the oil. A second paste was made up of the same proportions using untreated oil. The rheological properties are shown in the following table:

| Sample No. | Hegmann Texture | Consistency | MacMichael—30 R. P. M. 22 Wire, 25° C. | Strength, percent |
|---|---|---|---|---|
| Untreated Oil Ink | (No test; too viscous). | Standard | Could not evalute; paste was a heavy magma. | 100 |
| Treated Oil Ink | 1 | Much Lighter | 80 | 105 |

EXAMPLE 23

A series of samples were prepared in heat-set ink vehicles. In each case 500 parts of monosulfonic acid of phenylated para rosaniline (alkali blue dye powder) were incorporated into 1156 parts of the ink vehicle by mulling at 150 lb. pressure 4×100 revolutions on a Hoover automatic muller. In the first series, the vehicle contained 49% of a modified phenolic resin and 51% of a high boiling paraffinic solvent. In sample 1 no surface-active agent was added. In sample 2, 84 parts of bis-(7-ethyl-2-methyl-4-undecyl) sodium sulfosuccinate, a surface-active agent, were added; in sample 3, 84 parts of polysulfosuccinate of the monoglyceride of tallow acid sodium salts, a surface-active agent, were added; in sample 4, 84 parts of bis-(oleyl)-sodium sulfosuccinate, a surface-active agent, were added; in sample 5, 84 parts of calcium bis-(7-ethyl-2-methyl-4-undecyl)-sulfosuccinate, a surface-active agent were added.

A second series (samples 6 to 8) was prepared with a vehicle containing 52% of a zinc resinate and 48% of a high boiling paraffinic solvent.

In sample 6 no surface-active agent was added, whereas, samples 7 and 8 contain 84 parts of the polysulfosuccinate of the monoglyceride of tallow acid sodium salts and bis-(oleyl)-sodium sulfosuccinate, respectively. The properties of the resulting inks are shown in the following table:

| Number | Strength, percent | Evaluation Consistency | Hegmann Texture |
|---|---|---|---|
| 1 | 100 | Standard | 0 |
| 2 | 103 | Very Much Lighter | 5.0 |
| 3 | 100 | do | 4.0 |
| 4 | 105 | do | 5.0 |
| 5 | 104 | do | 4.0 |
| 6 | 100 | Standard | 4.5 |
| 7 | 103 | Sl. Lighter | 5.0 |
| 8 | 105 | Sl.-Mod. Lighter | 5.0 |

We claim:

1. A pigmented mineral oil ink, the pigment being associated with a strongly basic metal salt of a sulfosuccinate ester having at least one alcohol residue attached to a carboxyl group of the sulfosuccinate acid, the sulfonic acid group being attached to the strongly basic metal, the total number of carbon atoms in the alcohol residues being at least 18 and the amount of the sulfosuccinate being at least sufficient for a monomolecular film covering the pigment particles.

2. An ink according to claim 1 in which the sulfosuccinate has two ester groups.

3. An ink according to claim 2 in which both ester groups are saturated.

4. An ink according to claim 3 in which the saturated ester groups are alkyl groups.

5. An ink according to claim 4 in which the alkyl groups are branched.

6. An ink according to claim 5 in which the sulfosuccinate is di(7-ethyl-2-methyl-4-undecyl) sodium sulfosuccinate.

7. An ink according to claim 6 in which the pigment is alkali blue.

8. An ink according to claim 1 in which the sulfosuccinate is di(2,6,8-trimethyl-4-nonyl) sodium sulfosuccinate.

9. An ink according to claim 8 in which the pigment is alkali blue.

10. An ink according to claim 1 in which the sulfosuccinate has one ester group.

11. An ink according to claim 10 in which the ester group is branched alkyl.

12. An ink according to claim 11 in which the sulfosuccinate is 5,7,7-trimethyl,2(1',3',3'-trimethyl-butyl) octyl disodium sulfosuccinate.

13. An ink according to claim 12 in which the pigment is alkali blue.

14. An ink according to claim 1 in which the sulfosuccinate is a polysulfosuccinate of monoglycerides of higher fatty acids.

15. An ink according to claim 14 in which the pigment is alkali blue.

16. An ink according to claim 1 in which the sulfosuccinate is a diester of 3-octodecanoyloxy-2-hydroxy propanol.

17. An ink according to claim 16 in which the pigment is alkali blue.

18. A dispersion in a predominantly non-aromatic hydrocarbon solvent of a pigment associated with a sufficient amount of a sulfosuccinic ester having at least one ester group, the total number of carbon atoms in the ester groups being at least eighteen and the amount of the sulfosuccinate being at least sufficient for a monomolecular film covering the pigment particles.

19. A pigment coated with a layer at least one molecule thick of a sulfosuccinate having at least one ester group, the total number of carbon atoms in the ester groups being at least eighteen.

20. A pigment according to claim 19 in which the sulfosuccinate is a branched chain dialkyl sulfosuccinate.

References Cited in the file of this patent

UNITED STATES PATENTS

| Number | Name | Date |
|---|---|---|
| 1,524,872 | McLeod | Feb. 3, 1925 |
| 2,166,144 | Harris | July 18, 1939 |
| 2,377,172 | Murphy | May 29, 1945 |
| 2,415,255 | Lynch | Feb. 4, 1947 |
| 2,562,154 | Vitalis | July 24, 1951 |
| 2,567,281 | Gardepe | Sept. 11, 1951 |

FOREIGN PATENTS

| Number | Country | Date |
|---|---|---|
| 192,972 | Switzerland | Dec. 1, 1937 |
| 565,675 | Great Britain | Nov. 22, 1944 |

OTHER REFERENCES

Wolfe: "Printing and Litho Inks," 1941, pages 141–142.